US006707434B1

(12) United States Patent
Wilson

(10) Patent No.: US 6,707,434 B1
(45) Date of Patent: *Mar. 16, 2004

(54) COMPUTER WORKSTATION

(75) Inventor: David Andrew Graham Wilson, Winchester (GB)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1096 days.

(21) Appl. No.: 08/791,266

(22) Filed: Jan. 30, 1997

Related U.S. Application Data

(63) Continuation of application No. 08/353,944, filed on Dec. 12, 1994, now abandoned, which is a continuation of application No. 08/112,169, filed on Aug. 26, 1993, now abandoned.

(30) Foreign Application Priority Data

Oct. 3, 1992 (GB) .............................................. 9220832

(51) Int. Cl.[7] .................................................. G09G 5/00
(52) U.S. Cl. ........................ 345/1.1; 345/2.1; 345/748; 710/68; 709/247; 709/246
(58) Field of Search ............................ 345/2, 501, 502, 345/1, 3, 202, 326, 327–331, 1.1, 1.2, 1.3, 2.1–2.3, 748, 749, 156; 358/86; 348/441, 443; 178/18, 18.01; 709/220, 246, 247–250; 710/68; 382/276

(56) References Cited

U.S. PATENT DOCUMENTS 4,430,526 A * 2/1984 Brown et al. ................. 178/18
4,555,781 A * 11/1985 Baldry et al. .................. 345/2
4,574,374 A * 3/1986 Scordo ........................ 358/86
4,650,929 A * 3/1987 Boerger et al.
4,688,170 A * 8/1987 Waite et al. ................... 345/2
4,891,633 A * 1/1990 Imazeki et al. ................ 345/2
4,941,845 A * 7/1990 Eppley et al. .............. 439/505
4,949,169 A * 8/1990 Lumelsky et al. ............. 345/2
5,127,048 A * 6/1992 Press et al. ............. 379/100.15
5,138,659 A * 8/1992 Kelkar et al. ................ 348/441
5,191,525 A * 3/1993 LeBrun et al. .............. 707/500
5,239,373 A * 8/1993 Tang et al. .................... 178/18
5,315,633 A * 5/1994 Champa ...................... 348/15
5,438,671 A * 8/1995 Miles ......................... 395/200
5,467,126 A * 11/1995 Duvent ....................... 348/164
5,790,712 A * 8/1998 Fandrianto et al. ......... 382/276
5,821,987 A * 10/1998 Larson ........................ 348/19

OTHER PUBLICATIONS

The Norton pc Anywhere User's Guide by Symantec Corporation, 1990.*

* cited by examiner

Primary Examiner—Lun-Yi Lao
(74) Attorney, Agent, or Firm—Douglas W. Cameron; Anne. V. Dougherty

(57) ABSTRACT

A computer workstation runs an application 10 to participate in a video conference. The workstation contains a video adapter card 18 which converts a video signal produced by a camera 20 into a hardware specific format. Likewise, the video adapter card can also be used to display incoming video signals that are in the same hardware specific format. The workstation also contains software support modules (SSM). On the capture side, the SSM 16 provides a video signal in bit map form for transmission to terminals in the conference which do not have compatible video hardware. Correspondingly, on the display side the SSM 34 receives and displays incoming video signals in bit map form from other workstations which likewise do not have compatible hardware.

10 Claims, 2 Drawing Sheets

COMPUTER WORKSTATION

This is a continuation of application Ser. No. 08/353,944 filed on Dec. 12, 1994, now abandoned which is a continuation of Ser. No. 08/112,169 filed on Aug. 26, 1993 now abandoned.

DESCRIPTION

1. Technical Field

Over the last few years it has become increasingly common to connect personal computers or workstations together into networks so that different machines can communicate with one another. A typical approach has been the introduction of local area networks (LANs) that provide file transfer and other facilities between computers. Other types of link, for example Integrated Services Digital Network (ISDN), are also known.

2. Description of the Prior Art

Modern networks can support the development of facilities such as video conferencing, in which a video image of a user captured at one terminal appears on the screen at a second terminal, and vice versa. A typical video conferencing terminal is a personal computer equipped with a video camera and an adapter card that allows video images to be displayed within a window on the screen of the personal computer. These adapter cards were often first designed for displaying video stored on compact disks, but have now been incorporated into video conferencing systems. The use of such adapter cards in multimedia applications is described in "Multimedia", p112–p123, PC Magazine, Mar. 31, 1992, and "Back to Reality", p212–p223, Personal Computer Magazine, June 1992.

The very high data rates required to store, display or transmit video signals have compelled various forms of data compression to be used in order to reduce the amount of processing required. Typically this compression is performed by special purpose hardware on the adapter capable of operating at the required high speed. There is no single standard form of data compression for video signals, so that different hardware adapters each use their own particular compression algorithms: a result of this video compact disks are specific to a particular hardware adapter. This leads to a serious problem in video conferencing over heterogeneous networks, in which the workstations in the network are equipped with a variety of different types of hardware adapter. It is generally impossible for a compressed video signal produced by one type of adapter card and transmitted over the network to be decompressed and displayed at another workstation equipped with a different type of adapter card.

SUMMARY OF THE INVENTION

Accordingly, the invention provides a computer workstation including means for generating a video signal, means for transmitting the video signal over a network to one or more other computer workstations, and further including:

a first video subsystem comprising means for processing the generated video signal into a first predetermined compressed format and for passing it to the video transmission means;

a second video subsystem comprising means for processing the generated video signal into a second predetermined format and for passing it to the video transmission means;

and means for selecting whether to transmit a video signal in the first or second predetermined format to any particular node in the network.

Thus the computer workstation is effectively equipped with two parallel video subsystems that can produce different video outputs for transmission over the network (based on the same basic video signal). The first video subsystem is typically hardware based, and produces a compressed signal that is specific to that hardware unit. This compressed format can then be transmitted over the network with relatively low bandwidth requirements, but it is only possible for terminals equipped with compatible hardware to display this signal. Thus the computer workstation also includes a second video subsystem, which is designed to produce a much simpler video signal. This subsystem is based on software, with no special purpose hardware. The signal produced by this subsystem will be either uncompressed, or use a relatively simple compression algorithm that can easily be implemented in software. This signal can then be transmitted to those displays at terminals that do not have hardware compatible with that at the transmitting workstation. The lesser degree of compression for the signal in the second predetermined format will of course result in a lesser frame rate, but nevertheless it has been found that an acceptable video signal can be transmitted. The means for selecting the video format to use can be a simple switch based on stored information: e.g., for a given terminal use data in a given format. Alternatively, in a dynamically configured network, the means for selecting can provide a method whereby to terminals can negotiate to select which video format is most appropriate to the transmission of a video signal between them.

Correspondingly, the invention also provides a computer workstation including means for receiving an incoming video signal from a network, means for displaying the video signal, and further including:

a first video subsystem comprising means for processing a video signal received in a first predetermined compressed format and for passing it to the video display means;

a second video subsystem comprising means for processing a video signal received in a second predetermined format and for passing it to the video display means;

and wherein the receiving means includes means for forwarding the incoming video signal to the first or second video system.

Again, the computer workstation has first and second video subsystems, one of which will typically be based on specific hardware, such as a video adapter card, and one of which is software based. If the workstation is connected to a transmitting terminal with compatible hardware, then the workstation arranges for the video signal to be sent in the hardware-specific format for processing by the first video subsystem containing the appropriate hardware. However, if the receiving and transmitting workstations do not have compatible hardware, the data is sent in a second predetermined format. This format is much simpler, and the second video subsystem can be used to display this signal without the need for any specific hardware in the workstation. Again, the simpler video format used by the software unit will be less compressed than the hardware signal, and so either require greater bandwidth on the network, or else result in a lower frame rate.

In a preferred embodiment, the second predetermined format comprises representing the video signal as a series of bit maps, and the second video subsystem includes means for calling operating system routines to pass the bit maps to the video display means. Thus the second video subsystem requires no special hardware, but simply exploits the facilities already provided by the operating system of the workstation. The use of bit maps for the second predetermined format is a convenient and simple choice, but any format that allows easy compression/decompression by software could be used.

Of course, in general workstations will contain both the transmission and reception facilities described above, to allow them to fully participate in two-way video conferencing. Thus they will be capable both of transmitting a video signal in two (or more) different formats and of displaying an incoming video signal in two (or more) different formats. One of these formats will be a very simple software-processable format, such as a simple bit map, which will therefore act as a sort of lowest common denominator across the network to allow all the terminals to communicate with each other.

Preferably the video transmission means or the video receiving means is unaware whether said video signal is in the first or second predetermined format. In general the workstation will be running an application, which is responsible for transmitting or receiving the video signal. The fact that more than one video format is supported is therefore transparent to the application, which simply knows that a connection has been established with another terminal. This allows applications to be developed without having to know details about the video capture of display systems that are present at any given terminal.

The invention also provides a method for displaying a video signal received from a network at a computer workstation including video display means comprising:

determining whether to forward the video signal to a first or second video subsystem, and forwarding a video signal in a first predetermined format to the first video subsystem, and forwarding a video signal in a second predetermined format to a second video subsystem; processing the video signal at said first or second video subsystem; and forwarding the video signal from said first or second video subsystem to the video display means.

The invention further provides a method for generating a video signal at a computer workstation, said workstation including means for transmitting the video signal over a network to one or more other computer workstations, including the steps of:

converting the video signal into first or second predetermined format;

processing a video signal in the first predetermined format at a first video subsystem; processing a video signal in the second predetermined format at a second video subsystem;

and passing the video signal from the first or second video subsystem to the video transmitting means.

An example of the invention will now be described by way of example with reference to the following drawings.

DESCRIPTION OF THE PREFERRED EMBODIMENT

Figure 1:
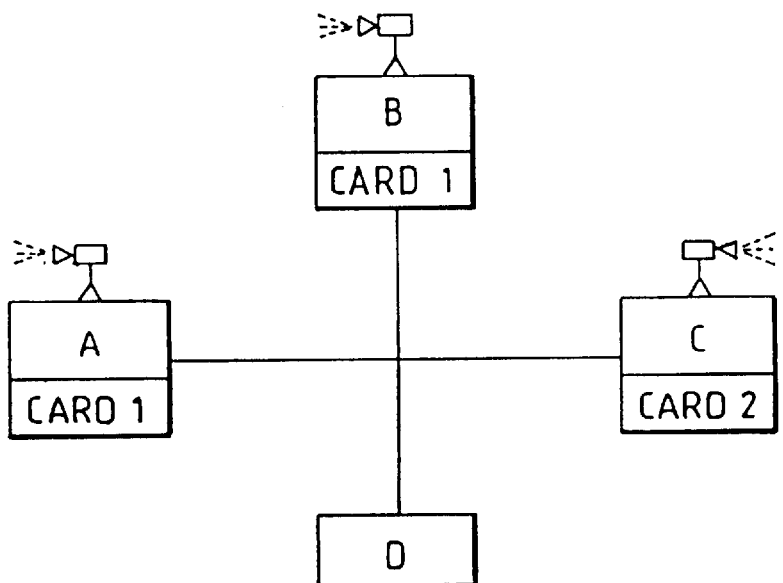
FIG. 1 illustrates a heterogeneous video conferencing network.

FIG. 1 illustrates a typical video conference on a network of four terminals. A, B, C, D. Terminals A, B, C can each be regarded as a standard personal computer equipped with a suitable video adapter card, plus a camera. An example of such a video adapter card would be the IBM/Intel Action-Media II card, which has a base card for displaying video in a predefined compressed format known at realtime time video (RTV) in a window, and a daughter card to receive a video input (in this case from the camera) and convert it into RTV format. The ActionMedia II card is described in more detail in the ActionMedia II Technical Reference, part number 92F2729 from IBM. As illustrated, terminals A and B have compatible video hardware, whereas terminal C has a different adapter with its own data compression format. Terminal D has no specialist video equipment, and so cannot capture or display video signals in any hardware format. It should be appreciated that the connections shown in FIG. 1 are schematic only, and do not necessarily represent the actual topology of the network.

Figure 2:
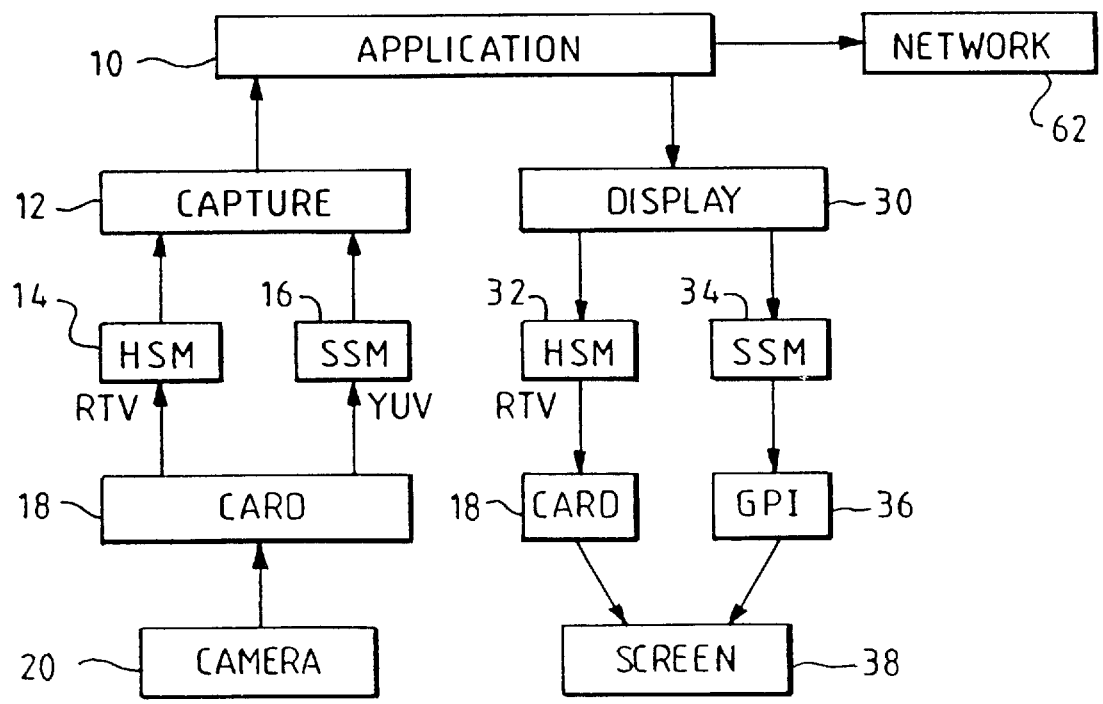
FIG. 2 illustrates a computer workstation with display and capture components in accordance with the invention.

The major components of a terminal equipped with an ActionMedia II video adapter card 18 are shown in FIG. 2. Overall control of the computer resides in the application 10 which in turn is connected in parallel to a capture system and a display system. At the head of the capture system is the capture layer 12, which is responsible for feeding the application with video signals when requested. The video signal is passed to the application effectively as a straight-forward data stream, which it then transmits over the network 62. The application does not know or care about the origin or format of the video signal, this being instead the concern of the capture layer.

For the terminal depicted in FIG. 2, the video signal is obtained from a camera 20 pointing at the user, although it would also be possible to use another source, for example a video tape. This signal is then fed to the ActionMedia II adapter card 18. Two different output formats are obtained from the adapter card. The first is RTV, which is specific to the ActionMedia card and is a compressed version of the video signal. The second output from the card is taken in standard YUV format, where Y is a monochromatic intensity, and U and V carry the color information. Two support modules, a hardware support module 14 and a software support module 16, are responsible for obtaining these frames in RTV and YUV format respectively. The software support module converts the YUV format frames into RGB (red-green-blue) format frames (bit maps). The frames are then passed to the capture layer, and through that to the application layer to be forwarded to another node on the network.

The software module sends the signal uncompressed, i.e., in bit map form, although some simple software compression technique could be used (the important factor is to be able to perform any decompression necessary at the receiving end without special purpose hardware). Clearly sending data in uncompressed format increases bandwidth requirements, resulting normally in a lower frame rate (assuming that the link between the transmitting and receiving nodes has a limited bandwidth). In practice, the software support module offers a variety of bit map forms (e.g., with different numbers of bits per pixel) and can arrange for a either a black and white or color image to be sent (the former is derived from the Y-signal from the ActionMedia II card). Using monochrome bit maps has the advantage of reducing bandwidth, and so allows a faster frame rate to be used. The volume of data required to send an uncompressed monochromatic video signal is about four times that required for the hardware compressed RTV color signal: for a color uncompressed signal, the figure is some three times higher still. Although this can lead to quite slow frame rates, it has been found in practice that even a slow video display is regarded as definitely preferable to no video display at all.

The display system of the terminal of FIG. 2 is headed by a display layer 30. The application receives a video signal over the network, which again is effectively just a data stream as far as the application is concerned. This data stream is then passed by the application to the display layer, which is responsible for forwarding the signal to an appropriate support module. The workstation of FIG. 2 contains two display support modules, a hardware support module 32 and a software support module 34. The former directs an incoming video signal in RTV format to the ActionMedia II adapter card 18, for display in the conventional manner (the ActionMedia card 18 is depicted twice in FIG. 2, once on the capture side and once on the display side, although in reality the workstation contains just a single card which performs both capture and display). Alternatively, if the incoming video signal is not in RTV format, but in software format instead, the software support module displays each frame of the video signal as a bit map. This is done by making a series of calls to the operating system, which will result in a succession of bit maps appearing in the appropriate window on the screen. For the OS/2 operating system, graphical programming interface 36 (GPI) calls are used—in particular, a succession of GpiBitBlt calls (see e.g., OS/2 Presentation Manager GPI, by Winn, van Nostrand Rheinhold, 1991 for more details about the GPI in OS/2). Thus the software support module allows some form of video signal to be displayed, even in the absence of a video adapter card.

Figure 3:
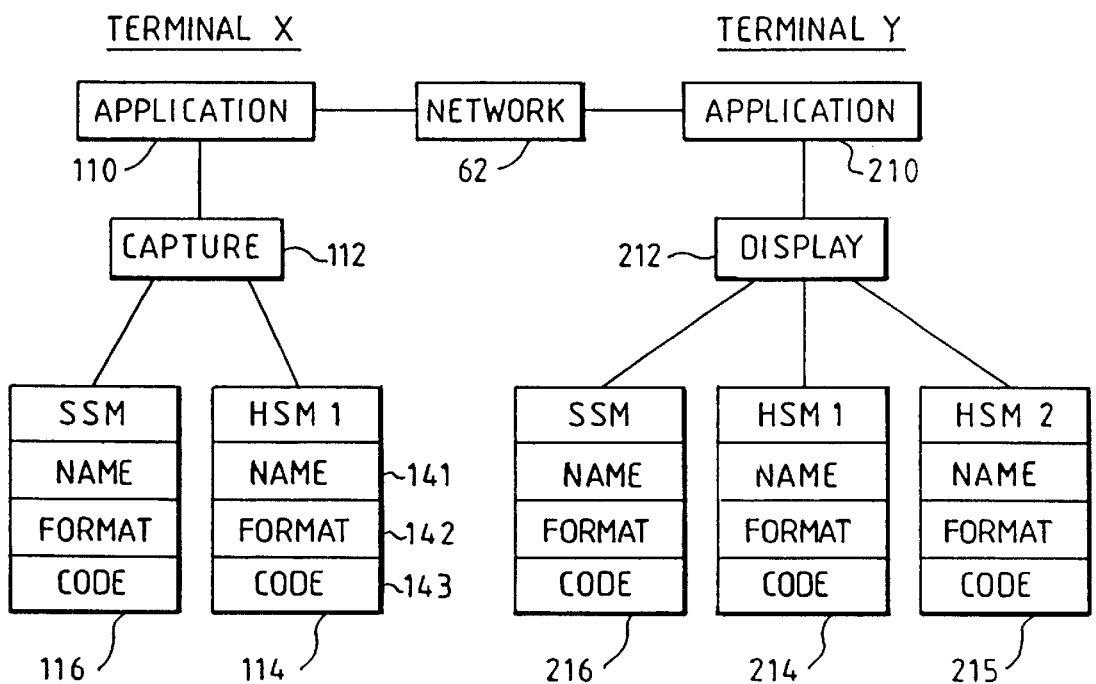
FIG. 3 illustrates two computer workstations connected over a network.

FIG. 3 illustrates two terminals X and Y connected by the network 62. Each terminal has a plurality of support modules: the capture side of terminal X contains one software support module (SSM) 116, and one hardware support module (HSM1) 114, while the display side of terminal Y contains one SSM 216 and two hardware support modules (HSM1 and HSM2) 214, 215. Each support module contains a name 141, format information 142, and code 143. The name allows that format to be identified, for example as ActionMedia II RTV, while the format information contains data such as the maximum frame rate, frame dimensions and so on for that format. The code performs the actual display or capture of video signals in that format, so that the hardware support module capture code for an ActionMedia II would be able to access the card and extract the RTV signal.

When it is desired to send a video signal from terminal X to terminal Y, the capture layer of terminal X sends to the display layer of terminal Y the names 141 of the video formats that it supports. The display system then matches these against its own supported formats, to identify any formats in common. If the two systems share more than one format, then the format can be chosen according to various criteria (e.g., lowest bandwidth requirements), or possibly the application can be made to prompt the user for a selection. The display system then returns a message to the capture layer indicating the format to be used.

Once a format has been agreed upon, then code associated with the relevant support module is activated at each module. Thus for example, if HSM1 corresponds to Actionmedia II RTV format for both terminal X and terminal Y so that this becomes the agreed format, the RTV support modules will be activated in each terminal. Terminal X will then begin transmitting in RTV format to terminal Y. On the other hand, if no match of hardware formats is obtained, for example terminal X contains an ActionMedia II card but terminal Y has incompatible hardware, then it is necessary to use the software support module.

Returning to FIG. 1 therefore, it is assumed that each terminal in the network includes a common software support module. These software support modules do not have to be identical in every terminal, but rather they must all be compatible in that each one can send or receive data in the same format. Thus for example the bit maps may be transmitted in the form appropriate to display at a terminal running the OS/2 operating system, but the software module at a terminal running a different operating system (e.g., UNIX) must be able to convert into a format appropriate for that terminal. Furthermore, each terminal must include the software to support the negotiation and selection of a format. In general this level of software compatibility is relatively easy to arrange compared to ensuring uniformity of hardware, since it is much simpler for users to install new software at their terminal then it is for them to replace existing hardware.

In addition to the common software support module, nodes A and B in FIG. 1 contain the hardware support modules appropriate to card 1, node C contains the hardware support modules appropriate to cord 2, while node D contains no hardware support modules. It can be seen that only for communications between A and B can the video signal be sent in the hardware compressed format: for all other combinations, it is necessary to use the software only format.

Computer workstations without any video adapter cards to other specific hardware also have the ability to participate in a video conference. Thus terminal D is unable to generate its own video signal, but can transmit instead a stationary bit map (i.e., its software module simply reads in a bit map which it then passes to the application for transmission). Nevertheless, the display software support module of terminal D is able to receive data in software-processable form, so that it can use standard hardware and operating system routines to display the video signal. Similarly, if terminal B did not have a camera, then although it would be able to display incoming video signals in the hardware format specific to card 1, it would not be able to capture its own video signal, and so would have to utilize the software support module to transmit its own bit map.

In the network of FIG. 1, a terminal is likely to be simultaneously communicating with more than one other terminal in the network. For example, terminal B could be receiving video signals from both terminals A and C at the same time (in different formats). It is clearly necessary therefore for the sender of each incoming video signal to be identifiable at B, so that B can forward the incoming signal to the support module selected for that sender. This is handled by the normal data communications process for sending messages between nodes.

Having thus described my invention, what I claim as new as desire Letters Patent is:

1. A first computer workstation for providing direct peer to peer communications with another computer workstation or terminal over a digital communication link without requiring intervention of a central control facility, said first workstation comprising:

means for receiving an incoming video signal from said second computer workstation or terminal on said digital communication link;

means for determining the format of said incoming video signal;

a first video subsystem comprising means for converting the video signal when received in a first predetermined compressed data format for display, said converting including decompressing the video signal from said first predetermined data format;

a second video subsystem comprising means for converting the video signal when received in a second predetermined data format; and means for displaying the processed video signal.

2. A computer workstation as recited in claim 1, wherein the second predetermined data stream type represents the video signal as a series of bit maps.

3. A computer workstation as recited in claim 2, wherein said second video subsystem includes means for calling operation system routines to pass the series of bit maps to the display means.

4. The computer workstation of claim 1, wherein said first video subsystem is implemented in first video subsystem hardware and wherein said second video subsystem is implemented in second video subsystem software.

5. In a computer workstation for providing direct peer to peer communications with another computer workstation or terminal over a digital communication link without intervention of a central control facility, said computer workstation having a video display means, a method for displaying a video signal received over said communication link, said method comprising the steps of:

automatically determining whether the video signal is in a first predetermined compressed data format or second predetermined data format type;

forwarding the video signal to a first video subsystem if the video signal is in the first predetermined data format;

forwarding the video signal to a second video subsystem if the video signal is in the second predetermined data format;

processing the video signal at the first or second video subsystem according to which of the video subsystems the video signal was forwarded, wherein the first video subsystem includes means for decompressing the video signal from said first predetermined data format; and displaying the processed video signal on the display means.

6. A method as recited claim 5, wherein in the second predetermined data stream type the video signal is represented as a series of bit maps, and wherein forwarding the video signal in the second predetermined data stream type to the video display means comprises calling operating system routines to display said series of bit maps.

7. In a peer to peer communications network including at least first and second computer workstations connected by a communication link, a method for generating a video signal at said first computer workstation for direct transmission to said second computer workstation without intervention of a central control facility, said method comprising the steps of:

capturing a video signal;

selecting whether to process the captured video signal into a first predetermined compressed data format or into a second predetermined data format for transmission to the second computer workstation;

converting the generated video signal into the selected predetermined data format, wherein for the first predetermined data format said converting includes compressing the generated video signal, such that it must be decompressed before it can be subsequently displayed; and transmitting the video signal in the selected data format to said second computer workstation or terminal.

8. A method as recited in claim 7, wherein the second predetermined data stream type represents the video signal as a series of bit maps.

9. A method as recited in claim 7, wherein said selected data stream type is determined by agreement between said first and second computer workstations.

10. A method as recited in claim 7, wherein said first computer workstation has a communication link for providing peer to peer communications with a third computer workstation, and wherein said video signal is transmitted in the first predetermined data stream type to said second computer workstation and in the second predetermined data stream type to said third computer workstation.

* * * * *